350-171 CROSS REFERENCE SEARCH ROOM
178
7.92
June 10, 1958 R. T. CAVANAGH ET AL 2,838,601
X2545
OPTICAL SYSTEM
Filed Oct. 25, 1955
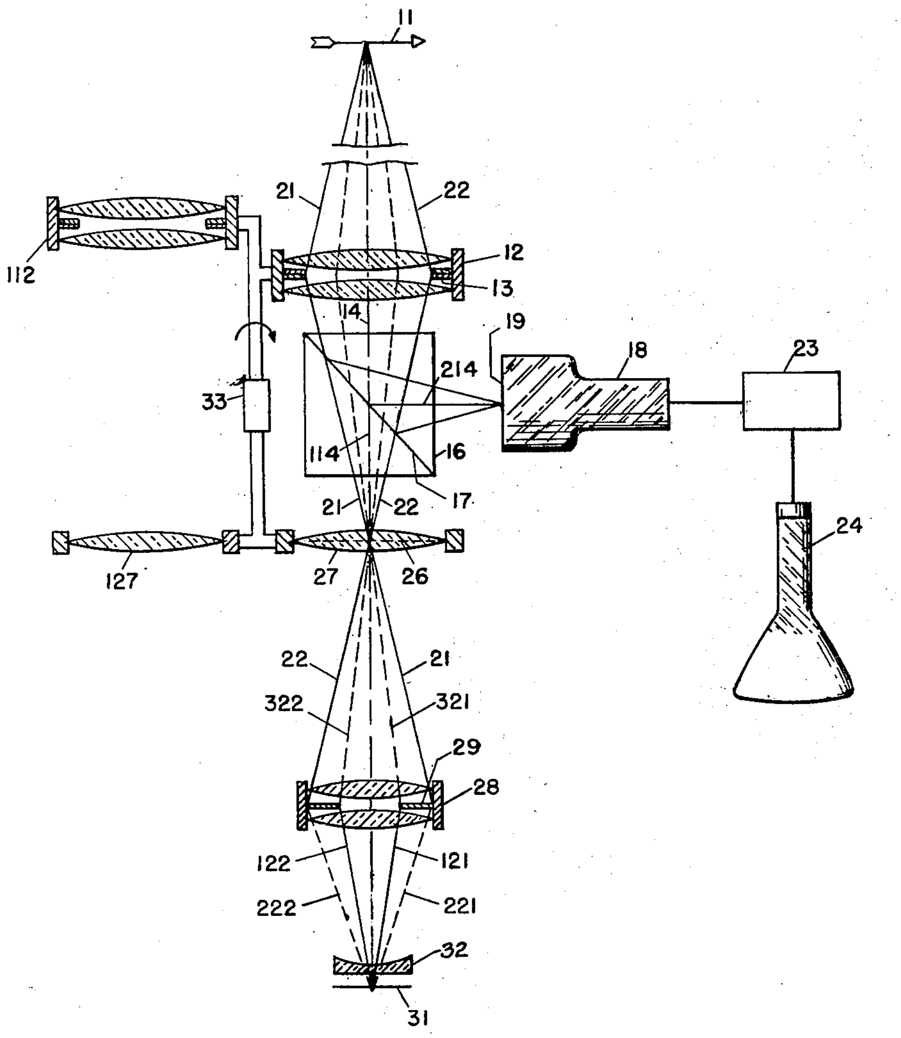
INVENTOR.
ROBERT T. CAVANAGH
JESSE H. HAINES
BY Darby + Darby
ATTORNEYS United States Patent Office 2,838,601
Patented June 10, 1958

2,838,601

OPTICAL SYSTEM

Robert T. Cavanagh, Pompton Plains, N. J., and Jesse H. Haines, Philadelphia, Pa., assignors to Allen B. Du Mont Laboratories, Inc., Clifton, N. J., a corporation of Delaware Application October 25, 1955, Serial No. 542,643

8 Claims. (Cl. 178—7.2)

This invention relates to an optical system for combination television and motion picture cameras of the type disclosed in an application entitled "Process and Apparatus for Making a Motion Picture," Serial No. 519,829 filed July 5, 1955, by James L. Caddigan and assigned to the assignee of the present application.

The combination camera referred to in the above-mentioned Caddigan application is so arranged that the television camera is used as a viewfinder operating through the lens of the motion picture camera. It is therefore possible for the cameraman to control the focus of the motion picture camera by observing the image on the television viewfinder which is commonly incorporated in each television camera.

However, as constructed heretofore, the optical elements of combined cameras have been so arranged as to give equal or greater depth of focus to light reaching the television pickup tube than to light reaching the motion picture film. In addition, because of the coarseness of the television resolution compared to the film record, the result is that the film is more critical as to focus than is the television pickup tube; and, therefore, when the cameraman focuses the objective lens to achieve a satisfactory focus on the television viewfinder, it is possible for the focus in the motion picture film to be less than satisfactory.

It is one object of the present invention to provide an improved optical system for combined television and motion picture cameras which will allow the motion picture section to have a greater depth of focus than the television section.

Another object is to provide an improved optical system having a primary iris diaphragm adjustment for both the television pickup tube and the motion picture film and a secondary iris diaphragm adjustment for the motion picture film alone.

Further objects will become apparent to those skilled in the art after reading the following specification taken together with the drawing in which the single figure is a diagrammatic representation of the optical system of the invention.

The optical arrangement by which the objects of the invention are carried out consists of an objective lens, usually having a principal iris diaphragm included within it, a television pickup device, and a motion picture film. A beam splitting element is located behind the objective lens to split the light passing through the lens into two paths, one of which leads to the television pickup device on which is formed an image of the subject matter to be recorded. The other path leads through a field lens, a relay lens, and usually a field flattened lens to the motion picture film to form thereon an image corresponding to the image formed on the television pickup device. Since the objective lens and its iris diaphragm determine the amount of light which passes to the remaining elements, it also determines the minimum depth of focus of the images formed on the pickup device and on the film.

In order to accomplish the desired result of having a greater depth of focus for the image formed on the film than for the image formed on the pickup device, the relay lens includes a secondary iris diaphragm which reduces the aperture of the relay lens and the amount of light reaching the film and therefore increases the depth of focus of the image formed on the film.

In the drawing, light from an object 11 is picked up by an objective lens 12 which includes as an element an adjustable iris diaphragm 13 located in the aperture plane of the lens to control the amount of light passing through to the remainder of the optical system. The light which passes through lens 12 follows an optical axis, or path, 14 through a beam splitting element 16 which may be a prismatic element of a type well-known in the optical art or, alternatively, it may be a semitransparent mirror. In either case, the beam splitting element 16 will include an interference film 17 which reflects part of the light along an axis 214 which is perpendicular to the original axis 14. The remainder of the light passes through the film 17 along an axis 114 which is parallel to axis 14 and may in fact be simply an extension thereof.

A television pickup tube 18 having a photosensitive surface, or face, 19 is located on axis 214 and, as indicated by the light rays 21 and 22, an image of object 11 is formed on the photosensitive surface 19. This image is transformed by tube 18 in the well-known way into a television signal which passes through television apparatus indicated by reference character 23 and is applied to a monitor, or viewfinder, tube 24 having a fluorescent screen on which appears a replica of the image formed on photosensitive surface 19.

Light which passes along axis 114 is brought to a focus at an aerial focus plane 26, as indicated. The term "aerial" is used to indicate that the light rays 21 and 22 come to a focus at plane 26 although there is no opaque surface on which this image can manifest itself. Instead of an opaque surface, a field lens 27 is located at or near the image plane 26 for a purpose to be described hereinafter. After passing through the field lens 27 the light rays 21 and 22 fall on a relay lens 28 having a secondary iris diaphragm 29 located in the aperture plane thereof. The purpose of relay lens 28 is to refocus the image from the aerial image plane 26 onto a motion picture film 31. A field flattener lens 32 is located immediately in front of the film 31 to correct for curvature of the image introduced by field lens 27, as described in the copending application of Jesse H. Haines, entitled "Congruent Optical System," Serial No. 542,642 filed concurrently herewith and assigned to the same assignee as the instant application.

It is well-known in the optical art that the depth of focus of an image is determined by the angle at which the outermost, or rim, rays, which are here indicated by rays 21 and 22, converge onto the image plane. The depth of focus characteristics of a lens may be indicated by the *f*-number of the lens; the larger the *f*-number, the smaller the opening in the iris diaphragm, and the greater the depth of focus. The minimum depth of focus of an image is determined by the maximum opening of the iris diaphragm in the lens forming that image and, in the present instance, the minimum depth of focus of the images formed on the photosensitive surface 19 of tube 18, and the motion picture film 31 is determined by the setting of iris diaphragm 13 in lens 12. Since it is desired to cause the image formed on the photosensitive surface 19 to have the smallest possible depth of focus, and certainly to have a smaller depth of focus than the image formed on film 31, light passing through lens 12 is focused thereby onto surface 19 without passing through additional focusing elements.

Light reaching the film 31, on the other hand, passes additionally through relay lens 28 and its iris diaphragm 29, the *f*-number of which may be changed independently of the *f*-number of iris diaphragm 13 and lens 12. It would be useless to use as lens 28 a lens having a minimum *f*-number smaller than the minimum *f*-number of lens 12, for the reason that the maximum amount of light available to pass through lens 28 is determined by lens 12, and opening the iris diaphragm 29 of lens 28 to a greater extent than is necessary to accommodate the cone of light passing through lens 12 and indicated by rays 21 and 22 would be futile.

However, iris diaphragm 29 may be adjusted to reduce the aperture, as shown, so that a smaller cone of light passes through lens 28 than passed through lens 12. This smaller cone of light is indicated by rays 121 and 122 and may be compared to the maximum possible cone of light indicated by the dotted lines 221 and 222. Thus it can be seen that film 21 receives light through a lens system having a larger effective *f*-number than the lens system supplying light to the photosensitive surface 19 and, therefore, the depth of focus of the image formed on film 31 will be greater than the depth of focus of the image formed on the photosensitive surface 19.

To illustrate the point still further, rays 121 and 122 have been projected backward through the optical system including lens 12 along paths indicated by reference characters 321 and 322. It may be seen by referring to the drawing that rays 321 and 322 pass through lens 12 in a smaller cone than do rays 21 and 22 and that therefore it is just as efficacious, so far as the image on film 31 is concerned, to reduce the opening in the secondary iris diaphragm as it would be to reduce the opening in the main iris diaphragm 13.

The purpose of field lens 27 is to converge outer rays (not shown) of the aerial image so that these rays will pass through lens 28. In doing so, lens 27 focuses an image of iris diaphragm 13 onto a plane which is approximately coincident with the aperture plane of relay lens 28. By definition, the light rays of an optical system are completely out of focus at the aperture plane of a lens and thus, it may be seen that the aperture planes of lenses 12 and 28, at which the iris diaphragms 13 and 29, respectively, are located, are both planes at which the light rays from object 11 are completely out of focus.

When lens 12 is changed to one of a different focal length, such as lens 112, the field lens 27 must be changed accordingly to maintain the approximate focal relationship between iris diaphragms 13 and 29. For that purpose, a turret mechanism 33 is provided to which objective lenses 12 and 112 and field lenses 27 and 127 are attached to be rotated into position together. The mechanism 33 may be kept as simple as possible by making the optical axis 114 the direct continuation of axis 14 and it is partly for this reason that it is the reflected light from layer 17 which is directed to the pickup tube 18 rather than the transmitted light. An additional reason of convenience for arranging the elements as shown in the drawing is that it is easier to obtain a beam splitting prismatic element 16 which will transmit more light than it is to obtain such an element which will reflect more light than it transmits. In its broadest aspect, however, there is no fundamental reason why the elements on axis 114 and the element on axis 214 could not be transposed.

The television system 23 interposed between the pickup tube 18 and viewing tube 24 need not be located in the apparatus containing the remainder of the elements in the drawing, but it is preferred that all of these remaining elements be packaged together so that the cameraman may, by observing the image on tube 24, aim and focus his combined television and motion picture camera so that the image formed on the motion picture film 31 will be properly centered and sharply in focus. To this end, the television image on the face of tube 24 should preferably have at least as good definition as the image on film 31. However, it is well known that commercial television images are relatively coarse in comparison to the images on motion picture film. For that reason, a television image on tube 24 may be so coarse that a slight misadjustment of lens 12 will not be noticed by the cameraman looking at tube 24, yet it will later be observed that the corresponding image on film 31 is less than satisfactorily focused. It is for this reason that the depth of focus of the image formed on the photosensitive surface 19 is kept as small as possible. A non-standard television system 23 having higher resolution capacities than the standard commercial television system will be an additional aid in making sure that the image on film 31 will be sharply in focus when the television image on tube 24 indicates proper focusing.

A final refinement of the apparatus is to form the film 17 in the beam splitting element 16 so that most of the light will be transmitted to the film 31 and only a minor fraction will be reflected to the photosensitive surface 19. The reason for this is that television tubes of the present day are normally at least as sensitive as motion picture film and usually considerably more sensitive. Thus, the ratio of transmitted light to reflected light may be anywhere from 1:1 to 9:1, or higher. If the beam splitting element is so formed, the iris diaphragm 13 may be opened to its greatest extent to admit the largest amount of light possible and to reduce the depth of focus of the image formed on the photosensitive surface 19 to the smallest degree possible, and yet the photosensitive surface will not be overloaded by receiving too much light. At the same time, so much light will be transmitted to the relay lens 28 that its iris diaphram 29 may be stopped down considerably without reducing the amount of light for film 31 to unsatisfactorily low levels. As a concrete example, the iris diaphragm 13 may be opened to give lens 12 an *f*-number of 2.8 while the iris diaphragm 29 of lens 28 may be closed, or stopped down, to give lens 28 an *f*-number of 5.6.

Although this invention has been described in terms of a particular embodiment, it will be obvious to those skilled in the art that modification may be made therein within the scope defined by the following claims.

What is claimed is:

1. An optical system comprising: an objective lens; a television pickup tube having a photosensitive face; a motion picture film; a beam-splitting element located to receive light passing through said objective lens and to direct part of said light along a different path to said photosensitive face to be focused thereon, the remainder of said light passing through said beam splitting element along a direct path to said motion picture film; a relay lens located on said direct path between said film and said beam splitting element to refocus light travelling along said direct path onto said film, said objective lens including a principal iris diaphragm to control the amount of light entering said optical system and to control the depth of focus of the image focused on said pickup tube and said relay lens including a secondary iris diaphragm to restrict additionally the light reaching said film thereby increasing the depth of focus of the image focused on said film.

2. The optical system of claim 1 in which said secondary iris diaphragh is adjustable independently of said principal iris diaphragm.

3. The optical system of claim 1 in which said beam splitting element has an interference coating to reflect light to said photosensitive face and to transmit light along said direct path, the ratio of light reflected to light transmitted being such as not to overload said tube.

4. The optical system of claim 3 in which said ratio is approximately 1:9.

5. An optical system comprising: an objective lens having an optical axis passing therethrough; a motion picture film located on said axis; a television pickup tube having a photosensitive face parallel to said axis and at one side thereof; a beam splitting element comprising an interference film located on said axis and at substantially a 45° angle thereto to reflect a portion of the light to said photosensitive face to form thereon an image focused by said objective lens; a relay lens located between said film and said beam splitting element to refocus on said film an image originally focused by said objective lens, said objective lens having a principal iris diaphragm to control the amount of light entering said system and to control the depth of focus of the image focused on said photosensitive face, and said relay lens having a secondary iris diaphragm to restrict additionally the amount of light reaching said film and to increase the depth of focus of the image formed on said film over the depth of focus of the image formed on said photosensitive face.

6. The optical system of claim 5 including a field lens on said axis between said relay lens and said beam splitting element to focus an image of said principal iris diaphragm on said secondary iris diaphragm.

7. The optical system of claim 6 wherein a turret mechanism is provided, said field lenses and objective lenses being mounted on said turret means in pairs, whereby operation of said turret means simultaneously changes said field and objective lens.

8. The optical system of claim 7 in which said field lens and said objective lens are mechanically linked together.

References Cited in the file of this patent

UNITED STATES PATENTS 2,698,356 Roos ------------------ Dec. 28, 1954